(12) United States Patent
Querejeta Andueza et al.

(10) Patent No.: US 11,067,285 B2
(45) Date of Patent: Jul. 20, 2021

(54) GAS COOKING APPLIANCE

(71) Applicant: Copreci, S. Coop., Aretxabaleta (ES)

(72) Inventors: Felix Querejeta Andueza, Hendaye (FR); Jose Ignacio Mugica Odriozola, Bergara (ES); Iñigo Albizuri Landazabal, Muxika (ES)

(73) Assignee: COPRECI, S. COOP., Aretxabaleta (ES)

( * ) Notice: Subject to any disclaimer, the term of this patent is extended or adjusted under 35 U.S.C. 154(b) by 305 days.

(21) Appl. No.: 16/241,196

(22) Filed: Jan. 7, 2019

(65) Prior Publication Data

US 2019/0137108 A1   May 9, 2019

Related U.S. Application Data

(63) Continuation of application No. PCT/ES2017/070496, filed on Jul. 10, 2017.

(30) Foreign Application Priority Data

Jul. 11, 2016  (EP) ..................... 16382328

(51) Int. Cl.
*F24C 3/12* (2006.01)
*F23N 5/12* (2006.01)
(Continued)

(52) U.S. Cl.
CPC ........... *F24C 3/126* (2013.01); *A47J 37/0713* (2013.01); *F23N 1/005* (2013.01); *F23N 5/123* (2013.01);
(Continued)

(58) Field of Classification Search
CPC ...... A47J 37/0713; F23N 5/245; F23N 5/206; F23N 5/123; F23N 1/005; F23N 2237/02;
(Continued)

(56) References Cited

U.S. PATENT DOCUMENTS 2,691,705 A * 10/1954 Ray .................. F23N 5/123
                                                      200/61.86
4,974,624 A * 12/1990 Gotanda ............. F16K 17/36
                                                      137/629
(Continued)

FOREIGN PATENT DOCUMENTS

CN   205190830 U   4/2016
DE   102008027546 A1   12/2009
(Continued)

OTHER PUBLICATIONS

International Search Report and Written Opinion in corresponding International Application No. PCT/ES2017/070496, dated Dec. 15, 2017, 15 pages.
(Continued)

*Primary Examiner* — Alfred Basichas
(74) *Attorney, Agent, or Firm* — Edell, Shapiro & Finnan, LLC (57) ABSTRACT

According to some embodiments gas cooking appliances are provided that include at least one burner, an electrode, and a push button unit with a push button for activating the electrode. A gas valve is provided for each burner for regulating gas flow arriving from a gas conduit. An electromagnetic shut-off valve is arranged in the gas conduit and includes a closure member for closing the passage of gas. A control unit controls the shut-off valve. The closure member includes a stable closed position and a stable open position, the closure member changing position upon receiving electric current pulses. The push button unit is configured for pushing the closure member of the shut-off valve to the open position while at the same time activating the control unit and the electrode when the push button is pressed when the gas cooking appliance off. The control unit controls the
(Continued)

shut-off valve by means of electric current pulses once the push button has been pressed.

18 Claims, 5 Drawing Sheets

(51) Int. Cl.
*F23N 5/24* (2006.01)
*F23N 5/20* (2006.01)
*F23N 1/00* (2006.01)
*A47J 37/07* (2006.01)

(52) U.S. Cl.
CPC ............ *F23N 5/206* (2013.01); *F23N 5/245* (2013.01); *F23M 2900/13003* (2013.01); *F23N 2223/38* (2020.01); *F23N 2227/36* (2020.01); *F23N 2235/14* (2020.01); *F23N 2235/16* (2020.01); *F23N 2237/02* (2020.01); *F23N 2241/08* (2020.01)

(58) Field of Classification Search
CPC ............ F23N 2241/08; F23N 2223/38; F23N 2235/16; F23N 2235/14; F23N 2227/36; F23N 5/082; F23N 5/242; F24C 3/126; F24C 3/124; F24C 3/122; F23M 2900/13003; F23D 14/72
See application file for complete search history.

(56) References Cited

U.S. PATENT DOCUMENTS

| | | | |
|---|---|---|---|
| 5,632,614 A * | 5/1997 | Consadori | F23N 5/20 431/79 |
| 6,041,768 A * | 3/2000 | Giammona | F24C 3/128 126/21 A |
| 6,322,352 B1 | 11/2001 | Zink | |
| 2008/0108002 A1 | 5/2008 | Huang | |
| 2009/0104573 A1 | 4/2009 | Chen | |
| 2009/0277508 A1* | 11/2009 | Pohl | E03C 1/055 137/88 |
| 2010/0001087 A1 | 1/2010 | Gum | |
| 2015/0150404 A1 | 6/2015 | Albizuri Landazabal et al. | |
| 2016/0109028 A1 | 4/2016 | Querejeta Andueza | |
| 2016/0265677 A1 | 9/2016 | Querejeta Andueza | |
| 2017/0138606 A1 | 5/2017 | Martinez Diez et al. | |

FOREIGN PATENT DOCUMENTS

| | | |
|---|---|---|
| EP | 1657492 B1 | 5/2006 |
| GB | 2249382 A | 5/1992 |
| WO | 2018011448 A1 | 1/2018 |

OTHER PUBLICATIONS

Extended European Search Report in corresponding European Application No. 16382328.9, dated Jan. 23, 2017, 8 pages.

* cited by examiner

FIG. 5 ial Application No. PCT/ES2017/
GAS COOKING APPLIANCE

CROSS-REFERENCE TO RELATED APPLICATIONS

This application relates to and claims the benefit and priority to International Application No. PCT/ES2017/070496, filed Jul. 10, 2017, which relates to and claims the benefit and priority to European Patent Application No. EP16382328.9, filed Jul. 11, 2016.

TECHNICAL FIELD

The present invention relates to gas cooking appliances.

BACKGROUND

Gas cooking appliances are known, particularly gas cooking appliances, comprising a gas conduit feeding at least one gas burner with gas, and a gas valve, which can be a manually-operated gas cock, for each gas burner, which allows regulating gas flow towards the burner. The flame in the gas burner, particularly in gas barbecues, is usually ignited by acting on an ignition electrode by means of a push button once the passage of gas to the burner is opened.

US20150150404A1 describes a gas cooking appliance, particularly a gas barbecue, comprising a plurality of gas burners, an ignition electrode, a push button for activating the electrode, a gas valve for each burner for regulating gas flow reaching the respective burner from a gas conduit, an electromagnetic shut-off valve arranged in the gas conduit, a control unit for controlling the shut-off valve and a control knob. To turn on the gas cooking appliance and activate the control unit, the user must open the gas valve corresponding to the burner to be turned on, he must open the shut-off valve placing the control knob in a first angular position, then he must press the push button to activate the electrode, and finally place the control knob in a second angular position for activating the control unit.

SUMMARY

Gas cooking appliances are provided that include at least one gas burner, an ignition electrode for turning on the burner, a push button unit with a push button for activating the electrode, a gas valve for each burner for regulating gas flow reaching the respective burner from a gas conduit, an electromagnetic shut-off valve arranged in the gas conduit comprising a closure member for closing the passage of gas, and a control unit for controlling the shut-off valve.

The closure member of the shut-off valve of the gas cooking appliance comprises a stable closed position and a stable open position, the closure member going from the open position to the closed position and vice versa when the shut-off valve receives electromagnetic electric current pulses. In the context of the present disclosure, a stable position is understood as that position in which the closure member remains fixed without having to electrically power the shut-off valve.

The push button unit of the gas cooking appliance is configured for performing three different functions when the push button is pressed with the gas cooking appliance off:
  i) for pushing the closure member of the shut-off valve to the open position,
  ii) for activating the control unit, and
  iii) for activating the electrode.

The push button unit can activate the electrode either directly or by means of the control unit. Once the push button has been pressed, the control unit controls the shut-off valve by means of electric current pulses.

Therefore, the gas cooking appliance incorporates a push button unit integrating in one single pressing operation at least the three cited functions, giving rise to an easier-to-operate and more compact gas cooking appliance with a lower cost due to the smaller number of parts forming it. The gas cooking appliance of the invention is simple and intuitive for the user, as the user only has to open the gas valve by means of which the flow of gas to the burner is regulated and then press the push button. In particular the user of gas barbecues has internalized that he must press a push button for igniting the burner, but in the gas barbecues of the prior art incorporating a shut-off valve and a control unit the user needs to perform further operations with actuators other than the push button unit to put the gas barbecue on.

These and other advantages and features will become evident in view of the drawings and the detailed description.

DETAILED DESCRIPTION

Figure 1:
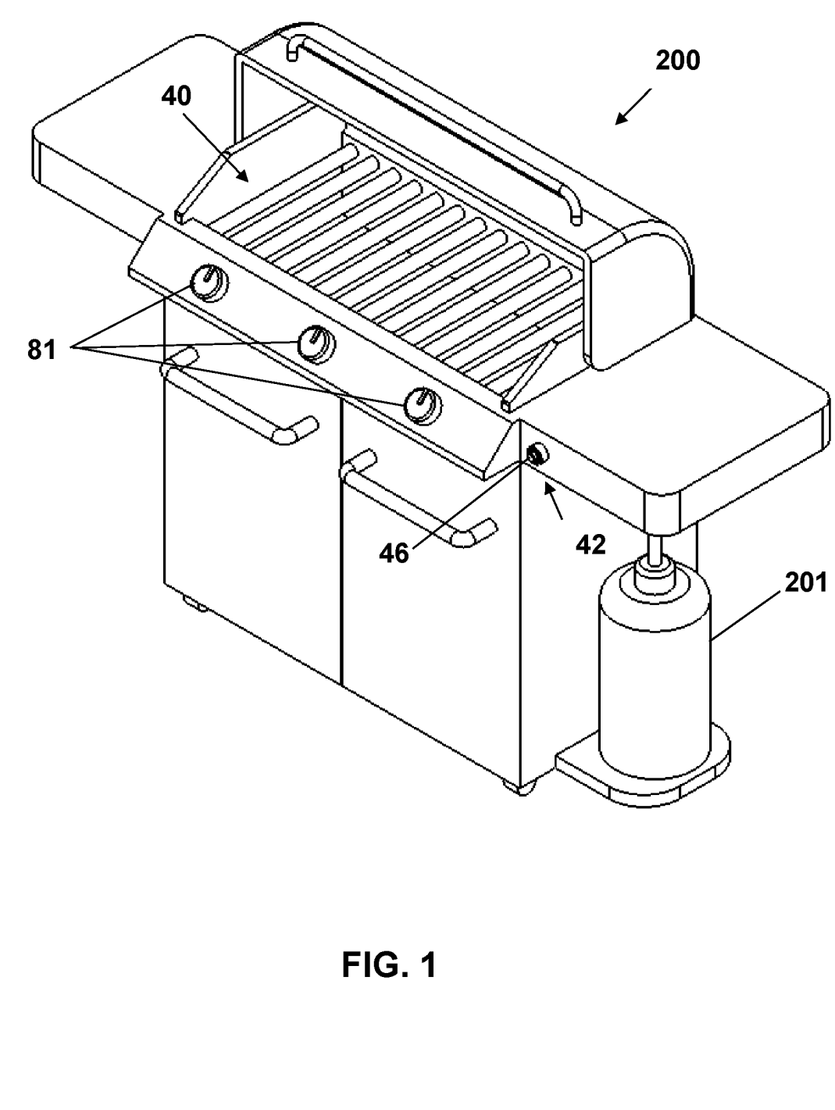
FIG. 1 shows a perspective view of a gas cooking appliance according to one embodiment.
Figure 3:
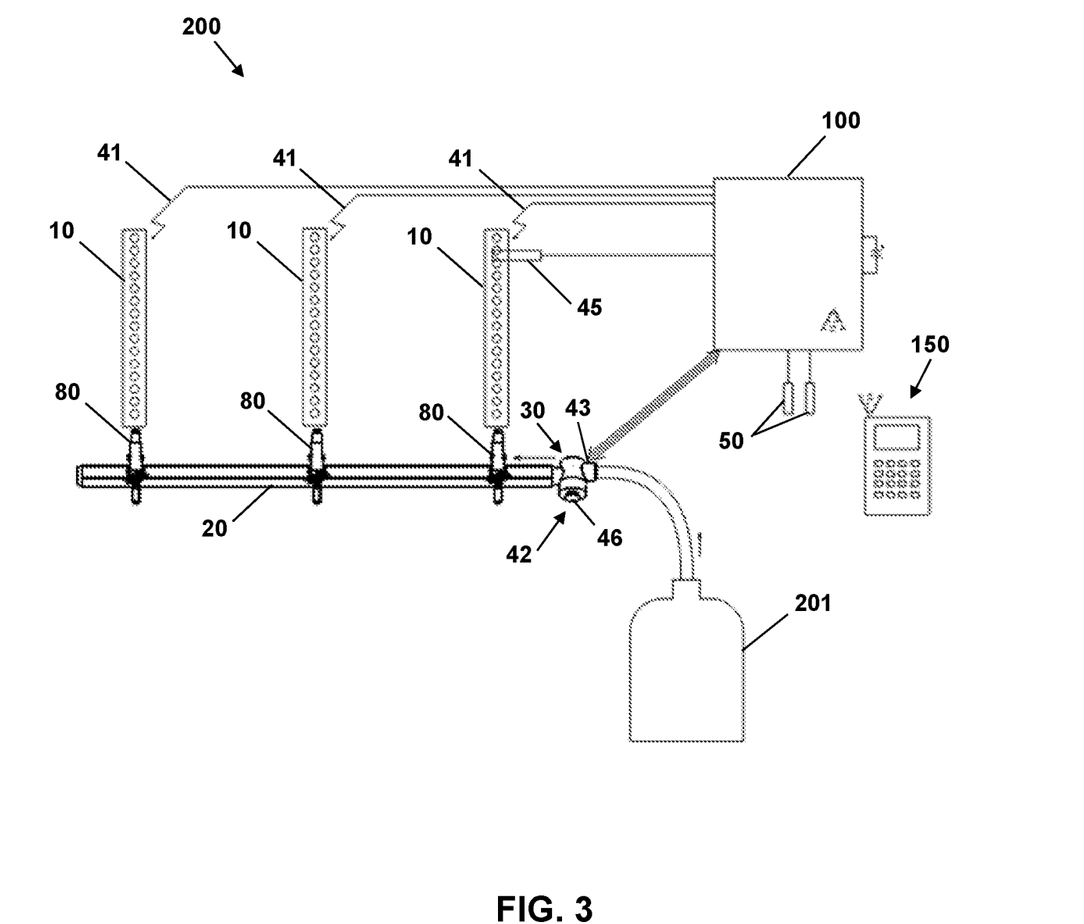
FIG. 3 shows a schematic view of the gas cooking appliance of FIG. 1.

FIG. 1 shows a perspective view of an embodiment of a gas cooking appliance 200, which in this case corresponds with a gas barbecue, but which in other embodiments (not depicted in the drawings) may correspond with other type of gas cooking appliances, such as, for example, gas ovens or gas cooktops. The gas cooking appliance 200 comprises a support structure supporting a cooking area in the upper portion, the structure comprising a control panel in its front portion. Inside the structure, the gas cooking appliance 200 comprises in the upper central portion a cooking chamber in which there is a cooking surface 40, which is a grill in this embodiment, but which can be, for example, a griddle in other embodiments of the barbecue. In this embodiment, three gas burners 10 are arranged under the cooking surface 40. Each gas burner 10 has a respective associated manually-operated gas valve 80 for regulating gas flow reaching each burner 10 from a gas conduit 20 which is connected to an external gas supply 201. Each gas valve 80 is actuated by means of a respective knob 81. As shown in FIG. 3, in this embodiment, the gas cooking appliance 200 comprises, associated with each burner 10, an ignition electrode 41 which allows igniting the flame in each burner 10.

Figure 2:
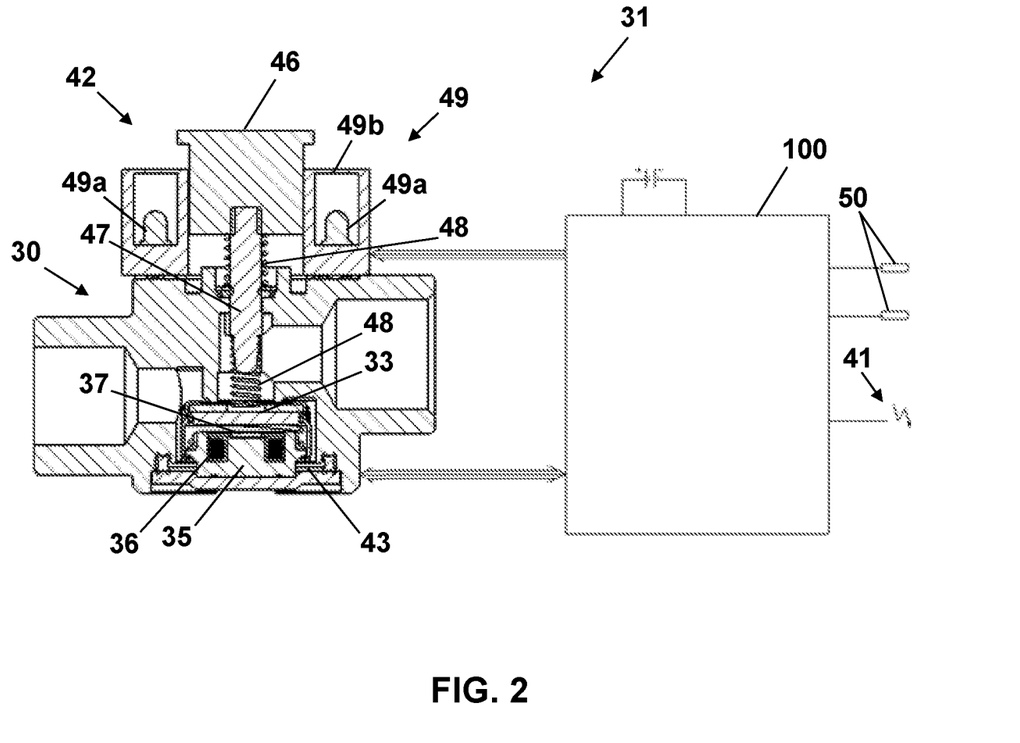
FIG. 2 shows a section view of an embodiment of the shut-off valve and the push button unit of the gas cooking appliance, and a schematic representation of the control unit with which the shut-off valve and the push button unit interact.

The gas cooking appliance 200 comprises an electromagnetic shut-off valve 30 arranged in the gas conduit 20, a push button unit 42 with a push button 46, and a control unit 100 for controlling the shut-off valve 30. FIG. 2 shows an embodiment of the shut-off valve 30 and a schematic representation of the control unit 100. The shut-off valve 30 comprises a closure member 33 for closing the passage of gas and is a bi-stable valve, the closure member 33 therefore includes a stable closed position and a stable open position, the closure member 33 changing its position when receiving electric current pulses. The magnetic means of the shut-off valve 30 comprise a static armature 35, a static permanent magnet 37, and a bobbin 36 that is placed in the static armature 35 and cooperates with the permanent magnet 37 depending on its power supply, the closure member 33 moving when the bobbin 36 is powered by means of electric pulses. The closure member 33 also comprises at least one ferromagnetic part, the permanent magnet 37 attracting the ferromagnetic part when the closure member 33 is in the opening position. Other embodiments of the magnetic means are also possible, as long as two stable positions are established for the closure member 33 and it goes from one position to another by applying electric pulses to the magnetic means. Thus, in another embodiment, the shut-off valve 30 can be, for example, as the bi-stable valve described in WO2014191349A1, patent application which is incorporated by reference in this application.

The push button unit 42 of the gas cooking appliance 200 is configured for, in any of its embodiments, perform at least three functions when the push button 46 is pressed with the gas cooking appliance 200 off:

i) push the closure member 33 of the shut-off valve 30 to the open position, ii) activate the control unit 100, and iii) activate the electrode 41.

Once the push button 46 has been pressed, the control unit 100 controls the shut-off valve 30 by means of electric current pulses. Therefore, by means of a single pressing operation by the user at least the three cited functions are performed.

In a first embodiment, shown in FIG. 3, the gas cooking appliance 200 comprises an electrical switch 43 which is activated when the push button 46 is pressed, the electrical switch 43 being electrically connected to the control unit 100. When the electrical switch 43 is activated the control unit 100 is activated and the control unit 100 generates sparks in the electrode 41. The control unit 100 controls the shut-off valve 30 by means of electric current pulses once the push button 46 has been pressed. In a preferred embodiment, the electrical switch is placed in the valve body of the shut-off valve 30.

Figure 4:
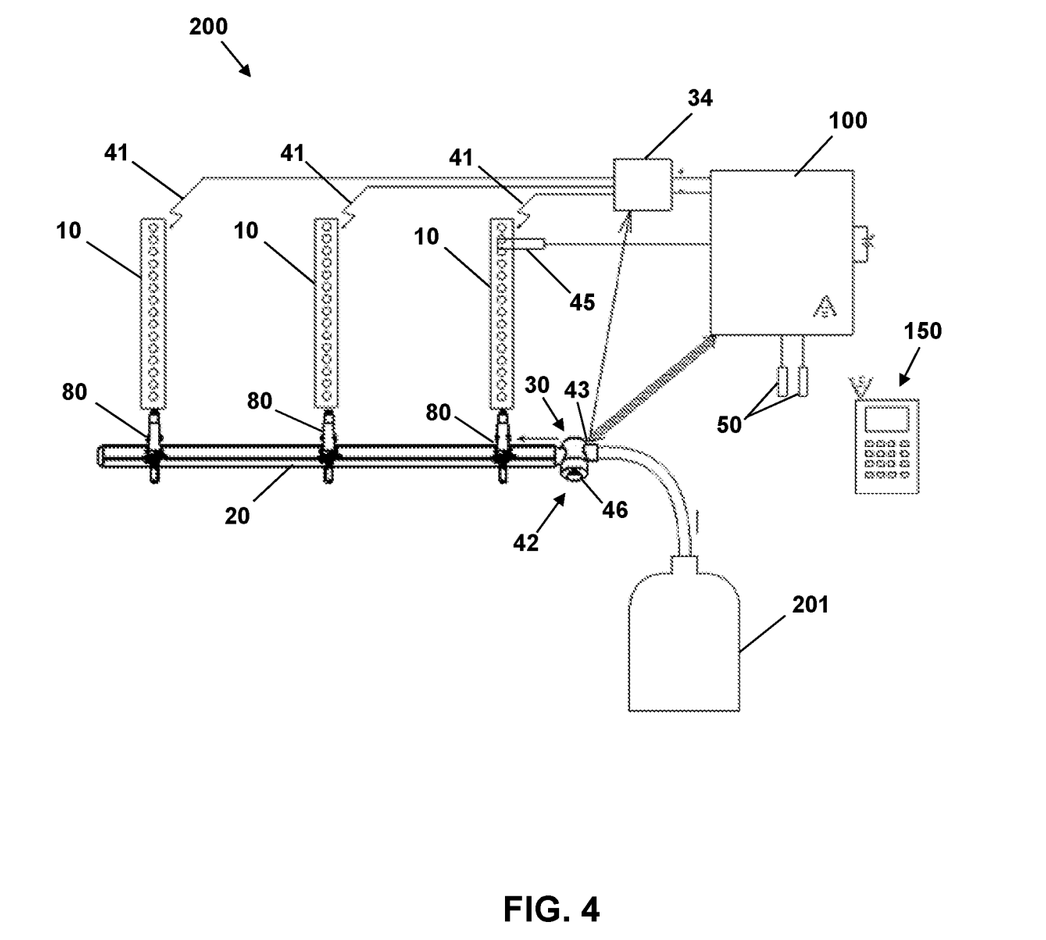
FIG. 4 shows a schematic view of a second embodiment of a gas cooking appliance.

In a second embodiment, shown in FIG. 4, the electrical switch 43 that is activated when the push button 46 is pressed is electrically connected, in addition to the control unit 100, to a spark generator 34, the control unit 100 being activated on the one hand and the spark generator 34 being activated on the other hand for generating sparks in the electrode 41. The rest of the feature of this second embodiment are the same as the ones of the first embodiment.

In a preferred embodiment, the control unit 100 receives instructions to perform different operations in the gas cooking appliance 200. It can receive the instructions depending on the time during which the push button 46 is kept pressed, and/or depending on the number of times that the push button 46 is pressed successively and/or depending on the frequency with which the push button 46 is pressed. These operations comprise the selection of at least one cooking variable, the cooking variables preferably comprising a cooking time and/or a cooking temperature, and preferably also comprise the lock and/or shut-off and/or cleaning of the gas cooking appliance 200.

On the other hand, once the push button 46 has been pressed for opening the shut-off valve 30, the control unit 100 allows connection with a remote control unit 150, in particular with a smartphone or with a tablet, the gas cooking appliance 200 being able to be monitored and controlled through the remote control unit 150.

In a preferred embodiment, as shown in FIG. 2, the push button unit 42 comprises lighting means 49 that inform the user about the state of the gas cooking appliance 200 depending on the color and/or intensity and/or the frequency of the light emitted by the lighting means 49. The lighting means 49 comprise at least one led 49a and a light guide 49b that delimits the contour of the push button 46.

In a preferred embodiment, the push button unit 42 is coupled to the shut-off valve 30, the shut-off valve 30 comprising an actuating shaft 47 attached to the push button 46 for pushing the closure member 33 of the shut-off valve 30 when the push button 46 is pressed, and elastic means 48 for pushing the actuating shaft 47 and the push button 46 back to a rest position when the push button 46 is released.

In a preferred embodiment, the shut-off valve 30, the push button unit 42 and the control unit 100 are part of an assembly 31, shown in FIG. 2, configured for being intercalated in the gas conduit 20. This allows to replace the assembly 31 in case of breakdown. Moreover, the assembly 31 can be intercalated in the gas conduit of conventional manual gas cooking appliances, turning them into gas cooking appliances with the capabilities of the gas cooking appliance 200. This assembly 31 preferably comprises at least one housing for a battery and an outlet for a thermopile 45, the housing being configured for housing rechargeable batteries that will be recharged through the thermopile 45.

In the first embodiment shown in FIG. 3, there is a flame sensor 45 arranged adjacent to a gas burner 10. This means that at least the burner 10 must be turned on whenever the gas cooking appliance 200 is turned on. In other embodiments of the gas cooking appliance 200 (not depicted in the drawings), a flame sensor 45 can be arranged in each gas burner 10, each connected to the control unit 100, and in this manner it would not be necessary to turn on a specific gas burner 10 in order to start this cooking mode in the gas barbecue 200. The flame sensor 45 allows the control unit 100 to have information about whether or not the gas burners 10 are turned on. This flame sensor 45 can be the ignition electrode 41 itself which allows generating sparks and also detecting flame. However, the flame sensor 45 can also be a thermopile, which allows the gas barbecue 200 to work with rechargeable batteries, the batteries being charged through the thermopile itself, such that when the thermopile is heated up with the flame of the gas burner 10, it generates sufficient electric current for charging the batteries.

In a preferred embodiment, the gas cooking appliance 200 comprises at least one temperature sensor 50 connected with the control unit 100, the control unit 100 acting on the shut-off valve 30 depending on the signal received from the at least one temperature sensor 50. In the embodiments shown in FIGS. 3 and 4, the gas cooking appliance 200 comprises two temperature sensors 50, a sensor for controlling the ambient cooking temperature of a cooking area, for example, the temperature sensor arranged inside the cover of the barbecue, and a food temperature sensor or "meat probe" which allows controlling the temperature of the food itself. In other embodiments of the gas cooking appliance 200 (not depicted in the drawings), the gas barbecue 200 can comprise several ambient temperature sensors 50 which allow controlling the temperature of several areas of the gas barbecue 200, and several food temperature sensors 50 which allow controlling the temperature of the food in different portions thereof.

Figure 5:
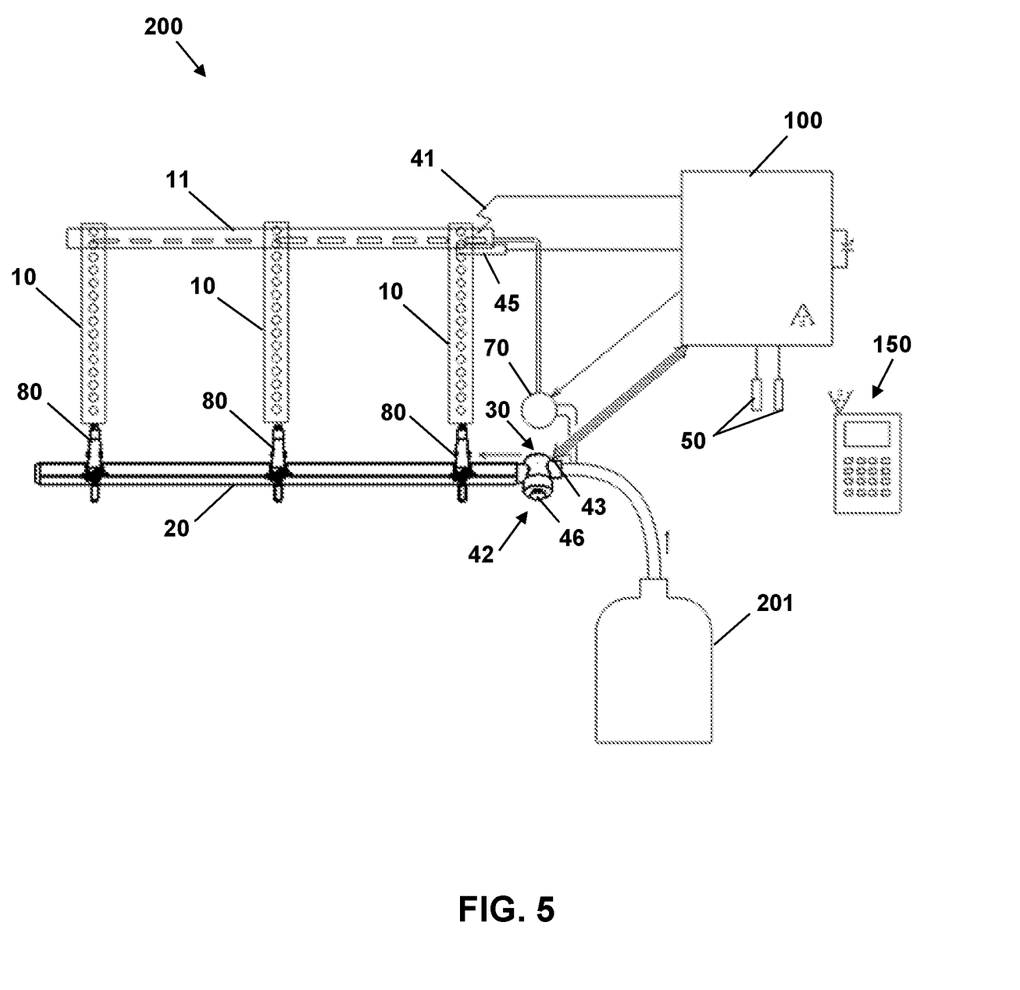
FIG. 5 shows a schematic view of a third embodiment of a gas cooking appliance.

FIG. 5 shows a schematic view of a third embodiment of the gas cooking appliance 200. This third embodiment of the gas cooking appliance 200 is also a gas barbecue basically comprising the same structural and operating elements as the first embodiment. The main difference with respect to the gas cooking appliance 200 of the first embodiment is that, in this third embodiment, the gas cooking appliance 200 comprises a pilot burner 11 adjacent to the gas burners 10, and an electromagnetic safety valve 70 for opening or closing the passage of gas to the pilot burner 11, which is electrically connected to the control unit 100. This third embodiment of the gas cooking appliance 200 does not have electrodes 41 arranged adjacent to the gas burners 10, with the exception of one electrode 41 arranged adjacent to the pilot burner 11. When the user presses the push button 46 with the gas cooking appliance off, the control unit 100 is activated and, in addition to activating the electrode 41, opens the safety valve 70. In another possible embodiment, the push button 46 itself acts on the safety valve 70 to open it. This safety valve 70 can be, for example, a solenoid valve. In this third embodiment of the gas cooking appliance 200, the assembly 31 comprises, in addition to the elements comprised in assembly 31 of the first embodiment, the safety valve 70.

In another embodiment, not shown in the figures, the gas cooking appliance 200 can comprise, apart from the push button unit 42, a complementary manual actuator electrically connected to the control unit 100, the complementary manual actuator being preferably a rotary knob with a rotating selector . . . . Therefore, the push button 46 can be used for selecting a first cooking variable, a cooking time, for example, and the complementary manual actuator can be used for selecting a second cooking variable, a cooking temperature, for example. This complementary manual actuator will preferably belong to the assembly 31.

The control unit 100 allows when the control unit 100 has been activated after pressing the push button 46, recording for each food to be cooked cooking modes defined by at least one selected ambient temperature in the gas cooking appliance 200, at least one selected temperature of the food to be cooked, and a cooking time. The control unit 100 will receive, through the temperature sensors 50, the ambient temperature and the food temperature existing in each moment of the cooking time. The control unit 100 records the existing temperatures and controls the opening or closing of the shut-off valve 30, depending on the evolution of the ambient temperature in comparison with the selected ambient temperature. This is what a gas cooking appliance 200 usually does when it performs a thermostatic function. However, different circumstances may arise in the gas cooking appliance 200 causing a deviation of the food temperature with respect to its expected evolution, either speeding up or slowing down its temperature evolution. When problems of this type arise, the control unit 100 is suitable for electrically actuating the opening or closing of the shut-off valve 30 depending on the deviation of the evolution of the food temperature with respect to the expected evolution of the selected food temperature which is recorded in a memory of the control unit 100, this action thereby having more priority than the usual action of controlling the shut-off valve 30 depending on the selected ambient temperature.

If with the evolution of the food temperature the control unit 100 foresees that the food will not be well cooked at the end of the cooking time, the control unit 100 is suitable for defining a new cooking time depending on the food temperature with respect to the expected evolution of the selected food temperature, but maintaining the selected ambient temperature of the cooking area used in the gas cooking appliance 200.

If yet with the evolution of the food temperature the control unit 100 foresees that the food will be not be well cooked at the end of the selected cooking time, i.e., the food will still be uncooked or will be burnt, the control unit 100 is suitable for defining a new cooking mode for the food to be cooked, defining a new selected ambient temperature in the gas cooking appliance 200, a new selected food temperature and a new cooking time.

In the different embodiments of the gas cooking appliance 200, the gas valves 80 used can comprise a rotation locating device (not shown in the drawings), electrically connected to the control unit 100, which allows detecting the opening of each gas valve 80, such that the control unit 100 can know the position of the knobs of the gas valves 80 at all times, the control unit 100 emitting an alarm when the user opens the shut-off valve 30 by pressing the push button 46, and the control unit 100 detects the opening of a gas valve 80. In an alternative embodiment, these gas valves 80 can also be electrically-operated gas valves controlled from the control unit 100.

The following clauses disclose in an unlimited way additional implementations, with each clause representing an implementation.

Clause 1: A gas cooking appliance comprising at least one gas burner (10), an ignition electrode (41) for igniting the burner (10), a push button unit (42) with a push button (46) for activating the electrode (41), a gas valve (80) for each burner (10) for regulating gas flow reaching the respective burner (10) from a gas conduit (20), an electromagnetic shut-off valve (30) arranged in the gas conduit (20) comprising a closure member (33) for closing the passage of gas, and a control unit (100) for controlling the shut-off valve (30), characterized in that the closure member (33) of the shut-off valve (30) comprises a stable closed position and a stable open position, the closure member (33) changing position upon receiving electric current pulses, and the push button unit (42) is configured for pushing the closure member (33) of the shut-off valve (30) to the open position, for activating the control unit (100), and for activating the electrode (41) when the push button (46) is pressed with the gas cooking appliance (200) off, the control unit (100) controlling the shut-off valve (30) by means of electric current pulses once the push button (46) has been pressed.

Clause 2: The gas cooking appliance according to clause 1, comprising an electrical switch (43) which is activated when the push button (46) is pressed, the electrical switch (43) being electrically connected to the control unit (100), the control unit (100) being activated and the control unit (100) generating sparks in the electrode (41) when the electrical switch (43) is activated with the gas cooking appliance (200) off.

Clause 3: The gas cooking appliance according to clause 1, comprising an electrical switch (43) which is activated when the push button (46) is pressed, the electrical switch (43) being electrically connected to the control unit (100) and a spark generator (34), the control unit (100) being activated on the one hand and the spark generator (34) being activated on the other hand for generating sparks in the electrode (41) when the electrical switch (43) is activated with the gas cooking appliance (200) off.

Clause 4: The gas cooking appliance according to any of the preceding clauses, wherein the control unit (100) receives instructions to perform different operations in the gas cooking appliance (200) depending on the time during which the push button (46) is kept pressed, and/or depending on the number of times that the push button (46) is pressed successively and/or depending on the frequency with which the push button (46) is pressed.

Clause 5: The gas cooking appliance according to the preceding clause, wherein the operations comprise the selection of at least one cooking variable, the cooking variables preferably comprising a cooking time and/or a cooking temperature.

Clause 6: The gas cooking appliance according to clause 4 or 5, wherein the operations comprise the lock and/or shut-off and/or cleaning of the gas cooking appliance (200).

Clause 7: The gas cooking appliance according to any of the preceding clauses, wherein once the push button (46) has been pressed for opening the shut-off valve (30), the control unit (100) allows connection with a remote control unit (150), in particular with a smartphone or with a tablet, the gas cooking appliance (200) being able to be monitored and controlled through the remote control unit (150).

Clause 8: The gas cooking appliance according to any of the preceding clauses, wherein the push button unit (42) comprises lighting means (49) that inform the user about the state of the gas cooking appliance (200) depending on the color and/or intensity and/or the frequency of the light emitted by the lighting means (49).

Clause 9: The gas cooking appliance according to the preceding clause, wherein the lighting means (49) comprise at least one led (49a) and a light guide (49b) that delimits the contour of the push button (46).

Clause 10: The gas cooking appliance according to any of the preceding clauses, wherein the push button unit (42) is coupled to the shut-off valve (30), the shut-off valve (30) comprising an actuating shaft (47) attached to the push button (46) for pushing the closure member (33) of the shut-off valve (30) when the push button (46) is pressed, and elastic means (48) for pushing the actuating shaft (47) and the push button (46) back to a rest position when the push button (46) is released.

Clause 11: The gas cooking appliance according to the preceding clause, wherein the shut-off valve (30) and the push button unit (42) are part of an assembly (31) configured for being intercalated in the gas conduit (20), the assembly (31) being interchangeable in case of breakdown and the assembly (31) being intercalable in the gas conduit of conventional manual gas cooking appliances.

Clause 12: The gas cooking appliance according to clause 10 or 11, wherein the assembly (31) also comprises the control unit (100).

Clause 13: The gas cooking appliance according to any of clauses 10 to 12, wherein the assembly (31) comprises at least one housing for a battery.

Clause 14: Gas cooking appliance according to clause 13, wherein the assembly (31) comprises an outlet for a thermopile (45), the at least one housing being configured for housing rechargeable batteries that will be recharged through the thermopile (45).

Clause 15: The gas cooking appliance according to any of the preceding clauses, comprising a pilot burner (11) adjacent to the burner (10) and a safety valve (70) for opening or closing the passage of gas to the pilot burner (11), the push button (46) opening the safety valve (70) when it is pressed with the gas cooking appliance (200) off.

Clause 16: The gas cooking appliance according to any of claims 1 to 14, comprising a pilot burner (11) adjacent to the burner (10) and a safety valve (70) for opening or closing the passage of gas to the pilot burner (11), the control unit (100) opening the safety valve (70) when the push button (46) is pressed with the gas cooking appliance (200) off.

Clause 17: The gas cooking appliance according to any of the preceding clauses, comprising at least one temperature sensor (50) connected with the control unit (100), the control unit (100) acting on the shut-off valve (30) depending on the signal received from the at least one temperature sensor (50).

Clause 18: The gas cooking appliance according to any of the preceding clauses, comprising at least one flame sensor (45) connected with the control unit (100), the control unit (100) acting on the shut-off valve (30) depending on the signal received from the at least one flame sensor (45).

What is claimed is:

1. A gas cooking appliance comprising:
   a burner;
   an ignition electrode for igniting the burner;
   a gas valve for regulating gas flow to the burner from a gas conduit;
   an electromagnetic shut-off valve arranged in the gas conduit, the electromagnetic shut-off valve including a closure member that is movable between a stable closed position and a stable open position, when the closure member is in the stable open position gas is permitted to flow through electromagnetic shut-off valve toward the burner, when the closure member is in the stable closed position gas is not permitted to flow through the electromagnetic shut-off valve;
   a control unit configured to deliver electric current pulses to the electromagnetic shut-off valve to cause the closure member to move between the stable open and closed positions; and
   a push button unit with a push button configured such that when the push button is moved from a non-depressed position to a depressed position the closure member is caused to move from the closed stable position to the open stable position and to also cause an activation of the control unit and the ignition electrode, the control unit configured to control the electromagnetic shut-off valve by use of the electric current pulses upon the push button being depressed, the push button unit forming a part of the electromagnetic shut-off valve, the electromagnetic shut-off valve including an actuating shaft having a first end and a second end, the first end being coupled to the push button and the second end being coupled to the closure member when the push button is in the depressed position, the electromagnetic valve including a spring that pushes against the actuating shaft to cause the push button to be continuously urged toward the non-depressed position.

2. The gas cooking appliance according to claim 1, comprising an electrical switch electrically connected to the control unit, the electrical switch configured to assume an open position and a closed position, when in the open position electrical power is not provided to the control unit, when in the closed position electrical power is provided to the control unit, the electrical switch configured to transition from the open position to the closed position upon the push button assuming the depressed position, when power is provided to the control unit, the control unit is configured to deliver current to the ignition electrode.

3. The gas cooking appliance according to claim 1, comprising an electrical switch electrically connected to the control unit and the ignition electrode, the electrical switch configured to assume an open position and a closed position, when in the open position electrical power is not provided to the control unit nor the ignition electrode, when in the closed position electrical power is independently provided to the control unit and the ignition electrode, the electrical switch configured to transition from the open position to the closed position upon the push button assuming the depressed position.

4. The gas cooking appliance according to claim 1, wherein the control unit is configured to perform different operations in the gas cooking appliance depending on the time during which the push button is kept depressed and/or depending on the number of times that the push button is successively depressed and/or depending on the frequency with which the push button is depressed.

5. The gas cooking appliance according to claim 4, wherein the different operations comprise the selection of at least one cooking variable, the at least one cooking variable including a cooking time and/or a cooking temperature.

6. The gas cooking appliance according to claim 4, wherein the different operations include a locking and/or shut-off and/or cleaning of the gas cooking appliance.

7. The gas cooking appliance according claim 1, wherein upon the push button assuming the depressed position, the control unit is configured to wirelessly connect with a remote control unit so that the gas cooking appliance is capable of being monitored and controlled by the remote control unit.

8. The gas cooking appliance according to claim 7, wherein the remote control unit is selected from the group consisting of: a smartphone and an electronic tablet.

9. The gas cooking appliance according to claim 1, further comprising lighting means associated with the push button that is used to indicate a state of the gas cooking appliance depending on the color and/or intensity and/or the frequency of light emitted by the lighting means.

10. The gas cooking appliance according to claim 9, wherein the lighting means comprises at least one light emitting diode that is configured to transmit light into a light guide that delimits a contour of the push button.

11. The gas cooking appliance according to claim 1, wherein the electromagnetic shut-off valve is capable of being inserted into and removed from the gas conduit.

12. The gas cooking appliance according to claim 1, wherein the electromagnetic shut-off valve and control unit form an assembly that is capable of being integrated into and removed from the cooking appliance as a singular unit.

13. The gas cooking appliance according to claim 12, wherein the assembly includes a housing for receiving a battery that powers the electromagnetic shut-off valve and control unit.

14. The gas cooking appliance according to claim 12, further comprising a rechargeable battery that supplies power to the electromagnetic shut-off valve and control unit, the gas cooking apparatus further comprising a thermopile that is electrically coupled to the rechargeable battery to recharge the rechargeable battery.

15. The gas cooking appliance according to claim 1, further comprising a pilot burner located adjacent to the burner and a safety valve for opening or closing the passage of gas to the pilot burner, the push button being operably coupled to the safety valve such that when the push button transitions from the non-depressed position to the depressed position the safety valve assumes an open position.

16. A gas cooking appliance according to claim 15, wherein the control unit is configured to cause the safety valve to assume the open position when the push button is depressed.

17. A gas cooking appliance according to claim 1, further comprising a temperature sensor that is configured to send a signal indicative of a temperature measured by the temperature sensor to the control unit, the control unit configured to act on the electromagnetic shut-off valve to cause the electromagnetic control valve to assume the stable closed position when the temperature measured by the temperature sensor reaches a threshold temperature.

18. The gas cooking appliance according to claim 1, further comprising a pilot burner located adjacent to the burner and a flame sensor that is configured to send a signal to the control unit when a flame is detected in the pilot burner, the control unit configured to act on the electromagnetic shut-off valve to cause the electromagnetic control valve to assume the stable closed position when the signal is not sent to the control unit.

* * * * *